United States Patent [19]

Mormann et al.

[11] Patent Number: 4,895,920

[45] Date of Patent: Jan. 23, 1990

[54] PROCESS FOR THE PREPARATION OF POLYURETHANES WITH LIQUID CRYSTAL PROPERTIES AND DIISOCYANATES SUITABLE FOR CARRYING OUT THE PROCESS

[75] Inventors: Werner Mormann, Kreuztal; Barbara Brahm; Martin Brahm, both of Siegen, all of Fed. Rep. of Germany

[73] Assignee: Bayer Aktiengesellschaft, Leverkusen, Fed. Rep. of Germany

[21] Appl. No.: 241,445

[22] Filed: Sep. 7, 1988

[30] Foreign Application Priority Data

Sep. 16, 1987 [DE] Fed. Rep. of Germany ....... 3730985

[51] Int. Cl.$^4$ .............................................. C08G 18/48
[52] U.S. Cl. ........................................ 528/76; 528/80; 528/85
[58] Field of Search ............................. 528/85, 76, 80

[56] References Cited

U.S. PATENT DOCUMENTS

| | | | |
|---|---|---|---|
| 3,719,708 | 3/1973 | Thoma et al. | 564/37 |
| 4,417,043 | 11/1983 | Cogswell et al. | 526/261 |
| 4,722,989 | 2/1988 | Starner et al. | 528/85 |
| 4,762,901 | 8/1988 | Dhein et al. | 528/73 |
| 4,791,187 | 12/1988 | Siiling et al. | 528/60 |

FOREIGN PATENT DOCUMENTS 6152830 11/1981 Japan ...................................... 528/85

OTHER PUBLICATIONS

Jnl. of Amer. Chem. Society, vol. 12, #3, 5–6/1979, pp. 537–538.

Primary Examiner—Maurice J. Welsh
Attorney, Agent, or Firm—Joseph C. Gil; Richard E. L. Henderson

[57] ABSTRACT

This invention relates to a process for preparing polyurethanes having liquid crystal properties comprising reacting, in proportions corresponding to an NCO/OH equivalent ratio of from about 0.9:1 to 1.1:1, an organic polyhydroxyl compound with an organic diisocyanate having at least two phenylene groups and at least one carboxylic ester group. The organic diisocyanate comprises an aliphatic diisocyanate wherein at least one of the carboxylic ester groups connects an aliphatic group to a phenylene group or an aromatic diisocyanate wherein at least one of the carboxylic acid groups connects two phenylene groups.

This invention further relates to preferred diisocyanates used in the process according to this invention.

4 Claims, No Drawings

PROCESS FOR THE PREPARATION OF POLYURETHANES WITH LIQUID CRYSTAL PROPERTIES AND DIISOCYANATES SUITABLE FOR CARRYING OUT THE PROCESS

BACKGROUND OF THE INVENTION

This invention relates to a new process for the preparation of polyurethanes with liquid crystal ("LC") properties from selected polyhydroxyl compounds and selected diisocyanates and further relates to some diisocyanates suitable for this process.

It was surprisingly found that polyurethanes with valuable LC properties are obtained when certain organic diisocyanates of the type described below are reacted with organic polyhydroxyl compounds described below to form polyurethanes.

SUMMARY OF THE INVENTION

This invention relates to a process for preparing polyurethanes having liquid crystal properties comprising reacting, in proportions corresponding to an NCO/OH equivalent ratio of from about 0.9:1 to 1.1:1,
(a) an organic polyhydroxyl compound with
(b) an organic diisocyanate having at least two phenylene groups and at leaast one carboxylic ester group, wherein the organic diisocyanates comprises
  (i) an aliphatic diisocyanate wherein at least one of the carboxylic ester groups connects an aliphatic group to a phenylene group, or
  (ii) an aromatic diisocyanate wherein at least one of the carboxylic ester groups connects two phenylene groups.

The invention also relates to preferred diisocyanates used in the process according to the invention, these preferred diisocyanates corresponding to the following general formula

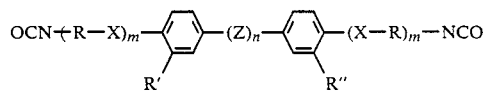

wherein
R is an alkylene group of 2 to 11 carbon atoms;
X is CO—O or O—CO;
Z is N=N, CH=CH, CO—O,

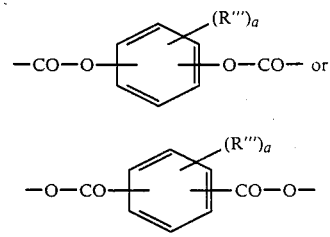

wherein
R', R", R''' are independently hydrogen, Cl, Br, NO$_2$ (preferably chlorine), C$_1$-C$_{20}$-alkyl, C$_1$-C$_{20}$-alkoxy, C$_1$-C$_{20}$-alkoxycarbonyl, C$_1$-C$_4$ branched alkyl,
a is 1, 2 or 3,
each m is identically 0 or 1, with the proviso that when m is 0, then n must be 1 and Z must be

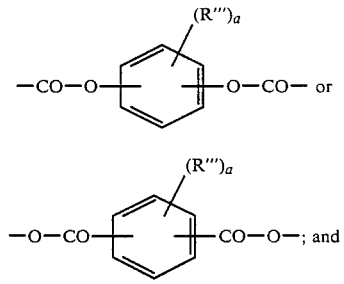

n is 0 or 1, with the proviso that when n is 0, then m must be 1.

DESCRIPTION OF THE INVENTION

Polyhydroxyl compounds (a) suitable for the process according to the invention include any organic polyhydroxyl compounds in the molecular weight range of from 62 to 6,000 known from polyurethane chemistry. For example, both simple alkane polyols in the molecular weight range of from 62 to 250 (optionally containing ether or ester bridges) and relatively high molecular weight polyhydroxyl compounds may be used, in particular the polyester and polyether polyols known from polyurethane chemistry.

Particularly preferred compounds to be used as component (a) according to the invention are alkane polyols in the molecular weight range of from 62 to 250, preferably from 90 to 200, in particular the corresponding alkane diols. The following are examples of suitable polyols of this type: ethylene glycol; 1,2- and 1,3-dihydroxypropane; 1,2-, 1,3-, 1,4- and 2,3-dihydroxybutane; the various isomeric dihydroxypentanes, -hexanes, -octanes, -decanes and -dodecanes; glycerol; and trimethylolpropane. Preferred polyhydroxyl compounds for use as component (a) include 1,4-dihydroxybutane, 1,6-dihydroxyhexane, 3-methyl-1,5-pentanediol, neopentyl glycol, diethylene glycol, triethylene glycol, tetraethylene glycol, dipropylene glycol and tripropylene glycol. Diols containing phenolic or, preferably, alcoholic hydroxyl groups, as represented by the following general formula

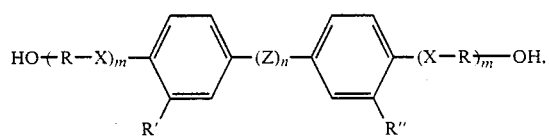

are also particularly suitable. R, R', R", X, Z, m and n have the meanings already indicated above in connection with the diisocyanates except that the provisos mentioned above do not apply here.

Components (b) are aliphatic or aromatic diisocyanates containing at least one ester group and at least two phenylene rings.

The following are examples of particularly suitable aromatic diisocyanates:
(1) 4-(4-isocyanatophenoxycarbonyl)phenyl isocyanate,
(2) 1,4-bis(4-isocyanatophenoxycarbonyl)benzene,
(3) 1,3-bis(4-isocyanatophenoxycarbonyl)benzene, and
(4) 1,4-bis(4-isocyanatobenzoyloxy)benzene.

The following are suitable aliphatic diisocyanates:
(5) 4,4-bis(omega-isocyantoalkanoyloxy)biphenyls, in particular those with 3 to 6 carbon atoms in the alkanoyl group, e.g., 4,4'-bis(3-isocyanatopropanoyloxy)-biphenyl or 4,4'-bis(6-isocyanatohexanoyloxy)biphenyl.

The diisocyanate (1) is already known from DE-AS 1,085,869. The diisocyanates (2)–(5) are new compounds within the scope of the above diisocyanate general formula and constitute the particularly preferred diisocyanates according to the invention.

The diisocyanate (4) and (5) may be prepared, for example, by reaction of the corresponding isocyanatocarboxylic acid chlorides with the corresponding O-silylated bisphenols. The diisocyanates (2) and (3) may be prepared, for example, by analogous reaction of terephthalic acid dichloride or isophthalic acid dichloride with O-silylated 4-isocyanatophenol. The other diisocyanates according to the invention corresponding to the above general formula may be prepared by analogous methods using starting materials corresponding to the diisocyanates.

The simple dicarboxylic acid chlorides required for these reactions have long been known. The isocyanatocarboxylic acid chlorides, such as 4-isocyanatobenzoic acid chloride, and isocyanatoalkane carboxylic acid chlorides are also compounds known from the literature and have been described, for example, in *J. Org. Chem.*, 31, 142 et seq. (1966).

The preparation of silylated organic compounds containing hydroxyl groups has been described, for example, by M-Lalonde and C. H. Chan in *Synthesis*, 817–845 (1985). This method may be employed, for example, for the preparation of O-silylated bisphenols, e.g. 1,3- or 1,4-dihydroxybenzene or 4,4'-dihydroxybiphenyl. Thus, the divalent phenols used as starting material may be reacted with hexamethyldisilazane ("HMDS") or with chlorosilanes such as trimethylchlorosilane to yield the corresponding O-trimethylsilane-substituted compounds.

The preparation of O-silylated isocyanatophenols, such as O-silylated 4-isocyanatophenols, may be carried out, for example, by reacting the corresponding O-silylated aminophenols with excess quantities of organic polyisocyanates that are non-volatile under the reaction conditions. Such reactions are carried out at temperatures of up to 300° C., preferably up to 200° C., and optionally at reduced pressure. The O-silylated isocyanates are obtained as distillates formed in the reaction.

The preparation of O-silylated aminophenols may be carried out, for example, by heating the aminophenols with HMDS used in a molar ratio of hydroxyl groups to HMDS of from 1:0.5 to 1:0.6 at temperatures of up to 170° C., preferably 50° C. to 170° C., in the presence of a catalytic quantity of trimethylchlorosilane. This reaction results in selective silylation of the hydroxyl group with elimination of ammonia.

The non-volatile polyisocyanates may be, for example, polyisocyanates which are not distillable or high boiling polyisocyanates which have a boiling point at least 20° C. above the boiling point of the O-silylated isocyanate at the pressure employed in the process. 4,4'-Diisocyanatodiphenylmethane, for example, is suitable for this purpose. The polysicoyanates are used in at least equal molar quantities so that at least one, preferably at least 1.1, isocyanate group of the polyisocyanate is available for each amino group of the aminophenol. The isocyanate groups may, of course, be used in an up to about 20 times equivalent excess but such large (and even greater) excesses cannot contribute to the efficiency of the reaction.

The O-silylated isocyantophenols may be prepared, for example, by introducing the non-volatile polyisocyanate component into a suitable distillation vessel equipped with stirrer or distillation bridge and then adding the O-silylated aminophenol portionwise with stirring within a temperature range of 20°–200° C., preferably starting at a temperature of 100°–140° C., and then gradually heating to temperatures of up to 200° C. after all the aminophenol has been added. The O-silylated isocyantophenol which forms spontaneously in this reaction is then obtained as a distillate, optionally with application of a vacuum.

The diisocyanates (1), (2), (3), and (4) may be prepared, for example, by mixing the corresponding isocyanatocarboxylic acid chloride or the corresponding dicarboxylic acid chloride with a equivalent quantity of the corresponding bis-silylated diphenol or with an equivalent quantity of O-silylated 4-isocyanatophenol, dissolving the resulting mixture in a suitable solvent such as o-dichlorobenzene; adding a catalytic quantity of a suitable accelerator (a Lewis acid such as titanium tetrachloride or zinc chloride or a weak base such as 4-dimethylaminopyridine) to the resulting solution; and then heating the reaction mixture to about 160°–170° C. so that the trimethyl chlorosilane formed in the reaction is distilled off. The end of the reaction can be recognized by the cessation of trimethylchlorosilane formation. The resultant diisocyanates may be purified either by vacuum distillation or by recrystallization from a suitable solvent such as, for example, heptane or o-dichlorobenzene.

The diisocyanates (5) may be prepared, for example, by mixing the corresponding isocyanatocarboxylic acid chloride with an equivalent or slightly sub-equivalent quantity of bis-silylated 4,4'-dihydroxybiphenyl; adding a catalytic quantity of 4-dimethylaminopyridine to the mixture; and heating the reaction mixture to 90°–150° C., optionally in the presence of a solvent such as o-dichlorobenzene or without a solvent. The trimethylchlorosilane formed in the reaction is then removed from the reaction solution under a vacuum. The resultant diisocyanate may be purified, if desired, by vacuum distillation or by recrystallization from a suitable solvent. The diisocyanates (1) to (5) themselves already have LC properties.

For carrying out the process according to the invention for the preparation of the polyurethanes, the starting components (a) and (b) are reacted together at temperatures of from 20°–200° C., preferably at 85°–140° C., in proportions corresponding to an NCO/OH equivalent ratio of from 0.9:1 to 1.1:1, preferably using equivalent quantities of starting materials. The reaction is preferably carried out in the presence of a suitable solvent such as, for example, dimethylformamide, dimethylacetamide, N-methylpyrrolidone, tetramethylurea, chlorobenzene, o-dichlorobenzene, anisole, tetrahydrofuran, dioxane, or mixtures of such solvents. Recovery of the polyurethanes may be carried out, for example, by introducing the resultant solution into methanol and then filtering off and drying the polymer which precipitates.

The products of the process according to the invention are polyurethanes which have anisotropic phases with LC properties above the melting temperature.

The following examples further illustrate details for the process and compounds of this invention. The invention, which is set forth in the foregoing disclosure, is not to be construed or limited either in spirit or in scope by these examples. Those skilled in the art will readily understand that known variations of the conditions and processes of the following preparative procedures can be used. In the following examples, all percentages are percentages by weight and all temperatures and degrees Celsius unless otherwise noted.

DESCRIPTION OF THE PREFERRED EMBODIMENTS

Example 1

Preparation of O-silylated 4-isocyanatophenols

Example 1.1

O-silylated 4-aminophenol

One mol of 4-aminophenol is introduced into a 500-ml three-necked flask equipped with magnetic stirring bar, internal thermometer, dropping funnel, and reflux condenser, as well as with bubble counter, drying tube and gas discharge tube. Hexamethyldisilazane (0.55 mol) is rapidly added dropwise. After the addition of three drops of trimethylchlorosilane as catalyst, the heterogeneous liquid mixture is slowly heated. Evolution of ammonia becomes evident at 50°–55° C. and becomes very vigorous at 130° C. The temperature is raised to 140°–170° C. until evolution of gas ceases. The homogeneous liquid is then purified by rectification in a mirrored vigreux column.

Example 1.2

Preparation of the isocyanate 4,4'-Diisocyantodiphenylmethane (500 g, 2 mol) is placed in a 500-ml flask equipped with magnetic stirring bar, internal thermometer, dropping funnel, distillation bridge, and a 100-ml nitrogen flask as receiver, and the compound is melted under argon. The silylated aminophenol (0.4 mol) from Example 1.1 is slowly added dropwise at 110°–120° C., with formation of white mists. When all the amine has been added, the apparatus is carefully evacuated with further heating at 200° C. The colorless liquid which distills over is then fractionated.

Yield: 95%.
b.p.: 52°–53° C. (0.24 mbar).
$n_D^{20}$: 1.5032.
IR spectrum: 2,280 cm$^{-1}$ (N=C=O).
$^1$H NMR spectrum: 6.92 (m, 4H); 0.31 (s, 9H) ppm
Elemental analysis (%): Calculated: C, 58.0; H, 6.3; N, 6.8. Found: C, 58.4; H, 6.2; N, 7.2.

Example 2

Preparation of aromatic ester diisocyantes (general method)

The isocyanato carboxylic acid chloride or dicarboxylic acid dichloride (0.025 mol) corresponding to the ester diisocyanate and an equivalent quantity of O-silylated 4-aminophenol are introduced into a 25-ml flask equipped with micro-distillation attachment. O-Dichlorobenzene (6 ml) is added as solvent and the reaction mixture is heated at 165° C. together with the catalyst until the formation of trimethylchlorosilane is completed.

The ester diisocyanate is worked up and purified by distillation at a pressure of $10^{-4}$ mbar or by recrystallization from a suitable solvent. For details, see the following table.

| No | Diisocyanate | Catalyst | Heating temperature for bulb tube distillation (°C.) | Recrystallization Solvent | Yield (%) | Melting temperatures[1] (°C.) | IR bands in cm$^{-1}$ | Elemental analysis (%) Calc. | Found |
|----|---|---|---|---|---|---|---|---|---|
| 1 | 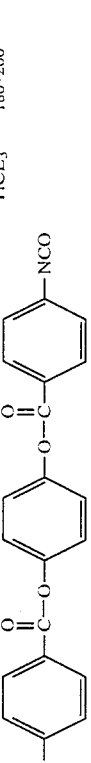 | TiCl$_3$ | 180–200 | | 68 | C 117.5 n 150 i | 2320[2], 1740 | C:64.3 H: 2.9 N:10.0 | 64.4 2.9 10.0 |
| 2 | 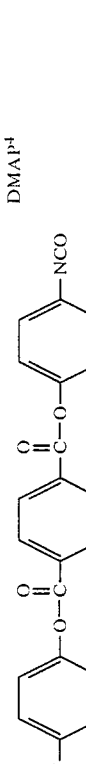 | DMAP[4] | | o-dichloro benzene | 34 30 | C 180n >300 d$^c$ | 2340+ 2300, 1730 2280[3] 1730 | | |
| 3 | 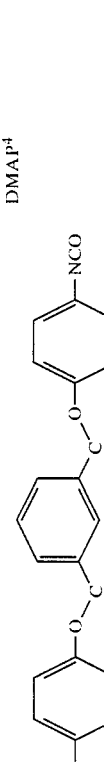 | DMAP[4] | | heptane | 81 85 | C 160 a >300 d$^c$ | 2310, 1735 | | |
| 4 | 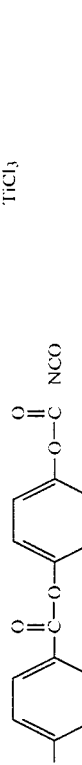 | TiCl$_3$ | | o-dichloro benzene | 48 | C 185n >300 d$^c$ | 2320[2], 1735 | | |
| 5 | 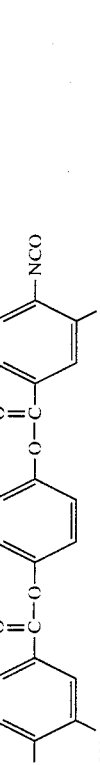 | H$_2$SO$_4$ | | o-dichloro benzene | 70 | K 177 a 230 i | 2290 1725 | C:67.29 H: 3.76 N: 6.54 | 67.06 4.01 6.45 |
| 6 | 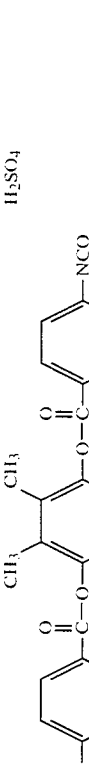 | H$_2$SO$_4$ | | o-dichloro benzene | 50 | K 185 a >300 i | 2280 1730 | | |

-continued

| No | Diisocyanate | Catalyst | Heating temperature for bulb tube distillation (°C.) | Recrystallization Solvent | Yield (%) | Melting temperatures[1] (°C.) | IR bands in cm$^{-1}$ | Elemental analysis (%) Calc. Found |
|---|---|---|---|---|---|---|---|---|
| 7 | 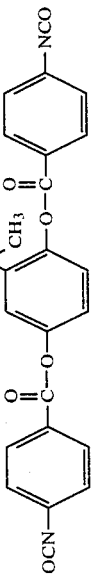 | $H_2SO_4$ | | o-dichloro benzene | 70 | K 188 a 165 i | 2295 1730 | |

[1]Abbreviations for melting data. C: crystalline; a: anisotropic; i: isotropic; n: nematic; d: decomposition in the anisotropic range.
[2]In nujol.
[3]As solution in o-dichlorobenzene.
[4]4-dimethylaminopyridine.

Example 3

Aliphatic-aromatic ester diisocyanates (general method)

The ω-isocyanatocarboxylic acid chloride corresponding to the desired diisocyanate is introduced together with O,O-bis-silylated 4,4'-dihydroxybiphenyl and a catalytic quantity of 4-dimethylaminopyridine into a 100-ml flask under nitrogen with micro-distillation attachment. The reaction mixture is then heated at 90°–130° C. and the trimethylchlorosilane which forms in the reaction is at the same time removed by distillation under a vacuum. The resulting ester diisocyanates are purified by vacuum thin-layer distillation.

Example 3.1

4,4'-bis(3-isocyanatopropanoyloxy)biphenyl

From 35 g (0.26 mol) of 3-isocyanatopropionic acid chloride and 30 g (0.09 mol) of 4,4'-bis(trimethylsiloxy)-biphenyl.
Reaction time: 19 h at 90°–130° C.
Yield: 22.3 g (65% of theory).
m.p. (from toluene): C 135° C. a, 160° C. i.
IR spectrum (nujol): 2280 (N=C=O); 1750 cm$^{-1}$ (C=O).

Example 3.2

4,4'-bis(6-isocyanatohexanoyloxy)biphenyl

From 35 g (0.2 mol) of 6-isocyanatohexanoic acid chloride and 23 g (0.07 mol) of 4,4'-bis(trimethylsiloxy)-biphenyl.
Reaction time: 45 h at 115° C.
Yield: 32.5 g (Ca. 100% of theory).
m.p. (thin layer evaporator, 200° C., 0.1 mbar): C 70.5° C. a, 79.5° C. i.
IR spectrum: 2280 (N=C=O), 1760 cm$^{-1}$ (C=O).

Example 4

Process according to the invention (general method)

About 5 ml of N,N-dimethylacetamide are distilled into a 25-ml flask under nitrogen. The diol and the ester diisocyanate are then weighed into the flask and the components are left to react at 85°–140° C. When the reaction is completed (IR) spectrum, the polymer is precipitated from methanol and dried.

Example 4.1

Polyurethane from 0.5 g (1.08 mmol) of 4,4'-bis(6-isocyanatohexanoyloxy)biphenyl and 0.097 g (1.08 mmol) of 1,4-butane diol Reaction time: 10 h at 80°–140° C.
Yield: 0.43 g (73% of theory).
m.p.: C 158 a, 167.9 i.

Example 4.2

Polyurethane from 0.822 g (2.93 mMol) of 4,4'-diisocyanatobenzoic acid phenyl ester and 0.347 g (2.93 mMol) 3-methyl-1,5-pentanediol Reaction time: 30 minutes at 125° C.
Yield: 1 g (86% of theory).
m.p. (microscope): C 260 a, 265 i (liquid-crystalline region can be strongly supercooled).
DSC: 140° C. (exothermic, recrystallization), 259° C. (endothermic, melting point), 380° C. (endothermic followed by exothermic decomposition).

Example 4.3

Polyurethane from 0.5 g (2.93 mmol) of 4,4'-bis(6-isocyanatohexanoyloxy)biphenyl and 0.112 g (1.08 mmol) of neopentyl glycol Reaction time: 10 h at 80°–140° C.
Yield: 0.48 g (Ca. 78% of theory).
m.p. (microscope): C 103.8 a, 119.5 i.
DSC: 102° C. (endothermic, melting point), 121° C. (endothermic), from 310° C. (endothermic followed by exothermic decomposition).

Example 4.4

Polyurethane from 657.5 mg (0.1535 mmol) of phenylene-1,4-bis-(3-methyl-4-isocyanato benzoate) and 181.4 mg (0.1535 mmol) of 3-methyl-1,5-pentane diol Reaction time: 3 h at 100° C.
Yield: 70%,
m.p. (microscope): K 226 a 230 i (liquid crystalline region can be strongly supercoated).

What is claimed is:

1. A process for the preparation of polyurethanes having liquid crystal properties comprising reacting, in proportions corresponding to an NCO/OH equivalent ratio of from about 0.9:1 to 1.1:1,
   (a) an alkane polyol having a molecular weight range of from 62 to 250; with
   (b) an organic diisocyanate having the formula $$OCN\text{–}(R\text{–}X)_m\text{–}\langle\text{ }\rangle\text{–}(Z)_n\text{–}\langle\text{ }\rangle\text{–}(X\text{–}R)_m\text{–}NCO$$
$$\qquad\qquad\quad R' \qquad\qquad\qquad R''$$

wherein
R is an alkylene group of 2 to 11 carbon atoms;
X is CO—O or O—CO;
Z is N=N, CH=CH, CO—O, $$-CO-O-\langle\text{ }\rangle-O-CO-\quad\text{or}$$
$$\qquad\qquad(R''')_a$$

$$-O-CO-\langle\text{ }\rangle-CO-O-$$
$$\qquad\qquad(R''')_a$$

R', R'', and R''' are independently hydrogen, Cl, Br, NO$_2$, C$_1$-C$_{20}$ alkyl, C$_1$-C$_{20}$ alkoxy, C$_1$-C$_{20}$ alkoxycarbonyl, or C$_1$-C$_4$ branched alkyl;
each m is identically 1; and
n is 0 or 1.

2. A process according to claim 1 wherein the organic diisocyanate is 4,4'-bis(omega-isocyanatoalkanoyloxy)biphenyl wherein the alkanoyl group has 3 to 6 carbon atoms.

3. A process according to claim 2 wherein the 4,4'-bis(omega-isocyanatoalkanoyloxy)biphenyl diisocyanate is 4,4'-bis(3-isocyanatopropanoyloxy)biphenyl or 4,4'-bis(6-isocyanatohexanoyloxy)biphenyl.

4. A process according to claim 1 wherein the alkane polyol is an alkanediol.

* * * * *

UNITED STATES PATENT AND TRADEMARK OFFICE
CERTIFICATE OF CORRECTION

PATENT NO. : 4,895,920

DATED : January 23, 1990

INVENTOR(S) : Werner Mormann et al

It is certified that error appears in the above-identified patent and that said Letters Patent is hereby corrected as shown below:

Column 1, line 28: Change "diisocyanates" to --diisocyanate--.

Columns 7 and 8 (table): Change first formula (labeled No. 1) from

"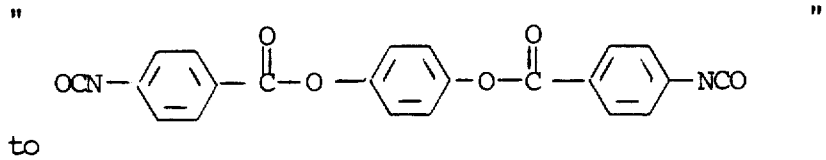"

to

--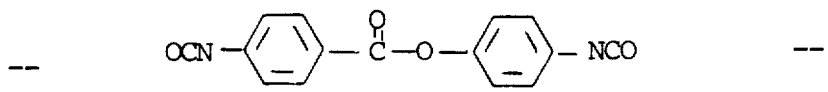--

Columns 7 and 8 (table): Change fourth formula (labeled No. 4) from

"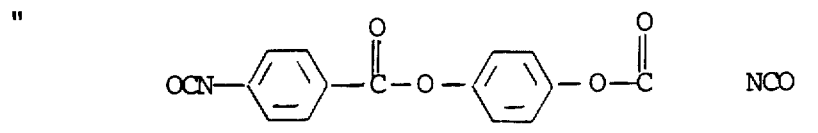"

to

--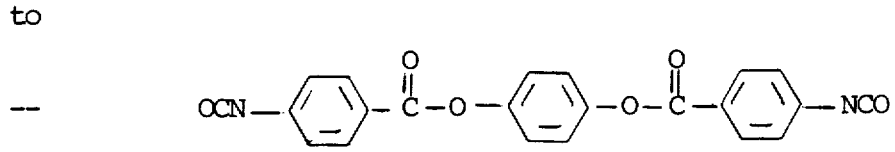--.

UNITED STATES PATENT AND TRADEMARK OFFICE
CERTIFICATE OF CORRECTION

PATENT NO. : 4,895,920

DATED : January 23, 1990

INVENTOR(S) : Werner Mormann et al

It is certified that error appears in the above-identified patent and that said Letters Patent is hereby corrected as shown below:

In Claim 1 (column 12), insert new line between lines 55 and 56 to read as follows:

-- a is 1, 2, or 3; --.

Signed and Sealed this

Twenty-ninth Day of September, 1992

Attest:

DOUGLAS B. COMER

*Attesting Officer*    *Acting Commissioner of Patents and Trademarks*